April 3, 1928.

E. L. CAVANNA

SHOE SUPPORT

Re. 16,924

Original Filed May 23, 1924

Inventor,

Eugene L. Cavanna

Witness:

Chas. R. Koursh.

By Wallace R. Lane.

Attys.

Reissued Apr. 3, 1928. Re. 16,924

UNITED STATES PATENT OFFICE.

EUGENE L. CAVANNA, OF CHICAGO, ILLINOIS.

SHOE SUPPORT.

Original No. 1,567,038, dated December 29, 1925, Serial No. 715,277, filed May 23, 1924. Application for reissue filed August 11, 1926. Serial No. 129,296.

This invention relates to shoe supports, and has for its object to provide means on which shoes, slippers or the like may be supported neatly against accidental displacement, and in such wise as to maintain the uppers facing outwardly to enable the wearer to readily select the shoes desired.

These and other objects will be more fully described in the following specification and shown in the accompanying drawings, in which—

Figure 1:
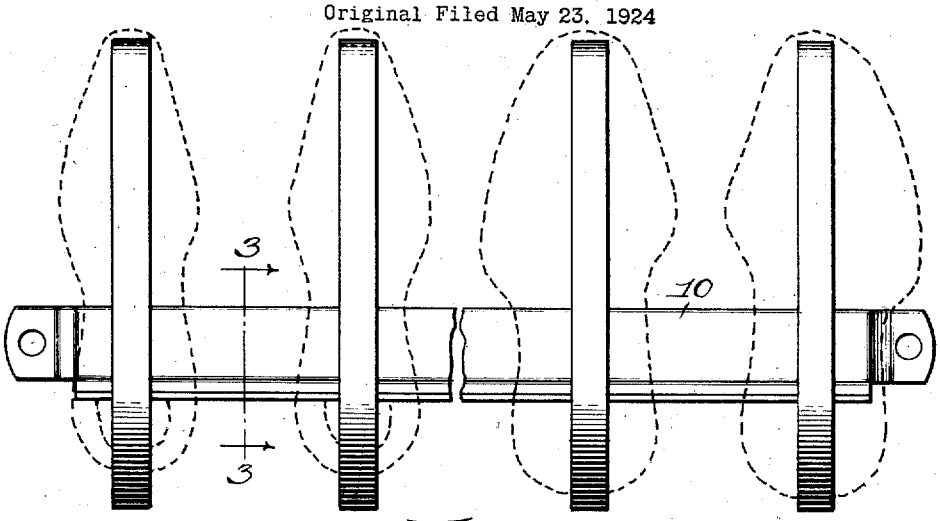
Fig. 1 is an inverted or bottom view of an embodiment of my invention, shoes being indicated in dotted lines as supported thereby.
Figure 2:
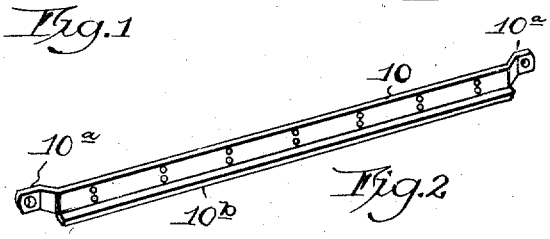
Fig. 2 is a perspective of the supporting strip.

Like numerals refer to like elements throughout the specification and the drawings, in which 10 indicates a transverse supporting member having the offset ends $10^a$ apertured for the insertion of attaching screws 11. The member 10 is further provided with an angularly bent outwardly extending flange $10^b$.

Secured by rivets 12 or the like to the member 10 are a plurality of shoe supporting members 15, having bent or looped portions $15^a$ insertable in the toe of a shoe, slipper or the like, to substantially fit the same to prevent collapse or indentation. The member 15 extends from the toe engaging portion $15^a$ downwardly and is curved around and then extended upwardly to form the portion $15^c$, which is secured by rivets 12 to the strip 10. At its upper end the portion $15^c$ terminates in the end $15^d$, which is slightly bent to lie against and contact the sole or bottom of the supported shoe, preferably adjacent the toe engaging portion $15^a$, so that the sole is pressed between the two portions.

Figure 3:
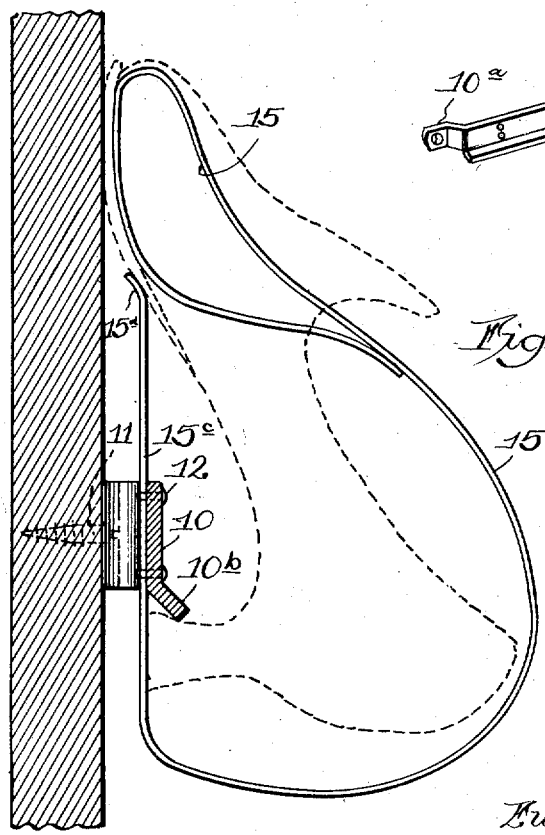
Fig. 3 is a vertical section along the line 3—3 of Fig. 1 and drawn to an enlarged scale.

The strip 10 is secured to the wall, moulding, supporting board or other suitable means by screws 11. When in use, as indicated in Fig. 3, the portion $15^a$ is pulled outwardly a sufficient distance to permit insertion into the toe of the shoe, the member 15 being preferably formed of spring metal and the heel is thereafter moved beneath the flange $10^b$ of the strip 10. By properly dimensioning and constructing the member 15, tension will be set up therein which will serve to pull the heel of the shoe against the flange $10^b$, thus retaining the same in supported position against accidental displacement. The end $15^d$ will coact, as stated, with the toe engaging portion $15^a$ to press the sole of the shoe therebetween so that added stability to the support is obtained.

With the construction as shown and described it will be apparent that a shoe will be yieldingly supported in position with the upper or more ornamental portion facing outwardly, thus enabling the wearer to select quickly the shoes he wishes to remove, at the same time preventing the unsightly appearance which would result if the soles faced outwardly. It will be recognized that supporting members of this character will result in economy of floor space as well as a more orderly support and arrangement of shoes and the like.

It will be noticed that as indicated in Fig. 3, the upright portion $15^c$ of the member 15 also acts as a stop for and contacts the heel of this supported shoe beneath the engaging flange $10^b$, thus insuring uniform support of the entire group of shoes or the like.

Figure 4:
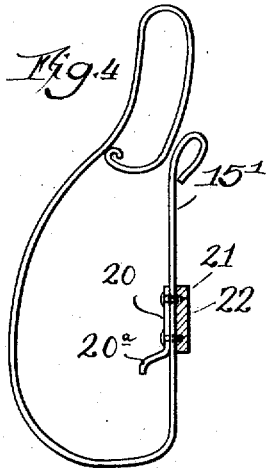
Fig. 4 is a view similar to Fig. 3 of a modficaton drawn to a reduced scale.

In Fig. 4 I have illustrated a modification comprising supporting members 15′ generally similar to the previously described members and each provided with a heel engaging member 20, having the heel engaging flange $20^a$, this member 20 being suitably secured to the member 15′. Screws 21 or the like are utilized to attach the member 15′ to a supporting strip of wood or the like indicated by the numeral 22. In other respects the functioning and construction is the same as the previously described embodiment, the strip 22 being secured in any suitable manner to a wall or the like.

It will be apparent that my invention is susceptible of modification, and I do not wish to be restricted to the form shown and described, except as defined in the appended claims.

What I claim is:

1. A resilient shoe support comprising a member having a portion insertable in the toe of a shoe or the like and a second portion extending therefrom to underlie and contact the sole of said shoe.

2. In combination a transverse supporting member, a shoe supporting means carried thereby, said means having toe and sole engaging portions, and said support having means to engage the exterior portion of the heel of a supported shoe.

3. A resilient shoe support comprising a member having a portion insertable in the toe of a shoe or the like and a second portion extending therefrom to underlie and contact the bottom of said shoe adjacent said toe engaging portion.

4. A resilient shoe support comprising a member having a portion insertable in the toe of a shoe or the like and a second portion extending therefrom to underlie and contact the bottom of said shoe adjacent said toe engaging portion, and means to engage the heel of said shoe when in supported position.

5. A resilient shoe support comprising a member having a portion insertable in the toe of a shoe or the like and a second portion extending therefrom to underlie and contact the bottom of said shoe adjacent said toe engaging portion, and means to engage the heel of said shoe when in supported position, said member being constructed and arranged to press said heel against said means.

6. A resilient shoe support comprising a member having a portion insertable in the toe of a shoe or the like and a second portion extending therefrom to underlie and contact the bottom of said shoe adjacent said toe engaging portion, and means to engage the heel of said shoe when in supported position, said member being constructed and arranged to contact and limit the movement of said heel.

7. In combination a transverse supporting member, a resilient shoe supporting means carried thereby, said means having a portion insertable in the toe of the shoe, and said support having means to engage the heel of a supported shoe.

8. In combination a transverse support having offset attachable end portions and a heel engaging flange, a plurality of resilient supporting members attached thereto and provided with toe engaging portions, and portions underlying said toe engaging portions.

In witness whereof, I hereunto subscribe my name to this specification.

EUGENE L. CAVANNA.